United States Patent

[11] 3,611,179

[72] Inventor Norman F. Fyler
     Menlo Park, Calif.
[21] Appl. No. 127,983
[22] Filed July 31, 1961
[45] Patented Oct. 5, 1971
[73] Assignee Litton Systems, Inc.
     San Carlos, Calif.

[54] OPTICAL MASER
     10 Claims, 5 Drawing Figs.
[52] U.S. Cl. .................................... 331/94.5,
     313/108 R, 313/109, 330/4.3
[51] Int. Cl. .................................... H01s 3/09
[50] Field of Search .......................... 88/61 L;
     313/107.5, 108, 109; 330/4.3; 331/94.5

Primary Examiner—Roy Lake
Assistant Examiner—Darwin R. Hostetter
Attorneys—Robert H. Lentz, Alan C. Rose and Clay Holland, Jr.

CLAIM: 1. A laser comprising a central fiber optic core including a plurality of individual optic fibers responsive to light of a predetermined spectral distribution for excitation into higher energy states and for the emission of coherent radiation upon discharge into lower energy states; a vacuum tube including a sleeneline elongated anode, a grid and a sleenelike elongated cathode surrounding said core and mounted concentrically and successively spaced outwardly from said core; said anode including a phosphor coating having a light output distribution of the same general range as said predetermined spectral distribution; and means for directing coolant between said core and said anode.

INVENTOR:
Norman F. Fyler

By Alan C. Rose
Attorney

OPTICAL MASER

This invention relates to "optical masers" which are also called "lasers."

The term "master" stands for "microwave amplification by stimulated emission of radiation." The term "laser" is patterned after the "maser" designation and stands for "light wave amplification by stimulated emission of radiation."

Optical masers, or lasers, are new devices which are believed to herald a new era in the realm of applications for electromagnetic radiations in the optical frequency range. The nature of the devices which have been operated up to the present time and some of the probable fields of application are discussed in some detail in a recent article which appeared at pages 52 through 61 of the June 1961 issue of Scientific American. The article was entitled "Optical Masers" and was written by Arthur L. Schawlow of the Bell Telephone Laboratories.

In brief, the optical maser of laser produces coherent light, in contrast to the noise-saturated light sources of the past. Thus, in the case of incandescent light sources or gaseous discharges, the light is produced by the random generation of photons, without any synchronism between the time of emission of the photons. In laser action, however, the light is emitted by transitions from one energy state of an atom or molecule to another energy state. Furthermore, these energy transitions are synchronized by controlling or stimulating the transitions from one energy state to another. In a properly operating laser, a preponderance of the emitted light occurs in a single coherent phase as large number of atoms or molecules jump from a higher energy state to a lower energy state in synchronism. One of the surprising things about laser phenomena is the synchronism of energy transitions which are triggered by photons from adjacent energy transitions.

For scientifically trained persons, potential applications of a coherent light source are boundless. Thus, to give one example from Mr. Schawlow's article, a single laser, if operated in the manner of a conventional modulated radiofrequency generator, could carry all of the information which is currently carried by all of the radio communication channels now in operation throughout the world.

The known embodiments of the laser principle, however, suffer from many difficulties. These include, for example, insufficient intensity of the light source which is employed to raise the atoms to their excited state, undesired diffusion or dispersion of the output light from the laser, and significant difficulties in cooling the active elements of the device. The principal objects of the present invention involve the elimination or reduction of these problems.

In accordance with the present invention, many of these difficulties may be overcome through the use of a laser employing, as its active element, a bundle of fiber optic filaments.

In another aspect, the invention contemplates excitation of the active laser components by an intense light source provided by a cathode-ray tube screen energized by an intense broad area electron beam.

In accordance with another aspect of the invention, cooling is provided for the fiber optic elements by the flow of a liquid coolant, and the fiber optic strands are arranged to permit the flow of coolant adjacent each individual strand.

Another aspect of the invention involves the application of a part of the output energy back into the fiber optic system, through the use of a fiber optic cable in which one end is bent around to direct light toward the other end of the cable. Such a reentrant structure provides feedback and also permits amplification when additional light is supplied to the input fiber optic channel.

Other objects, features and advantages will become apparent in the course of the following description of certain specific embodiments of the invention.

Figure 1:
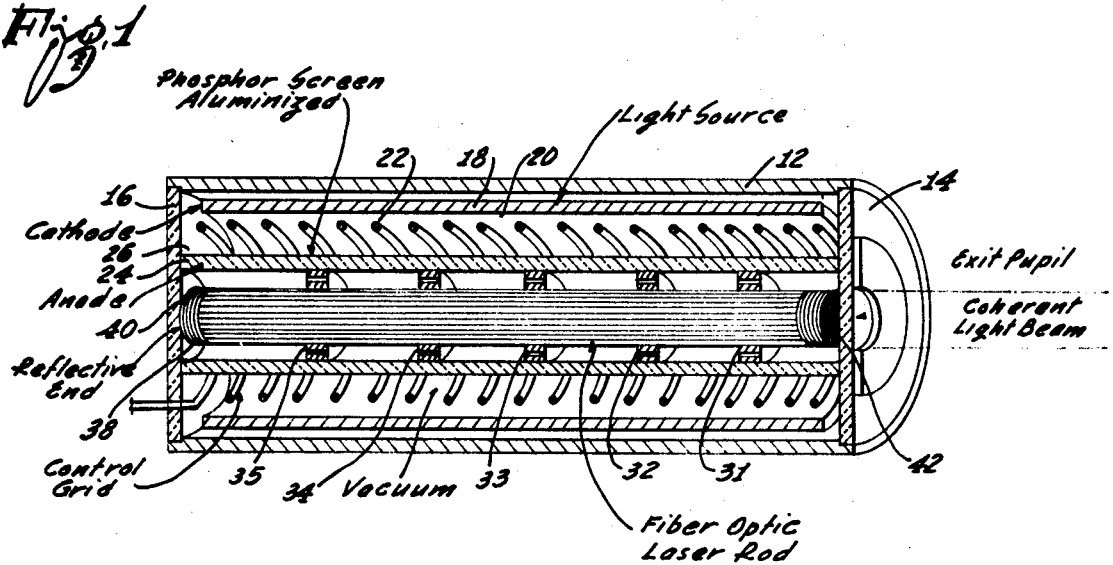
FIG. 1 shows a fiber optic laser device in accordance with the present invention.

With reference to FIG. 1, a vacuum tube is provided which has an outer vacuum sealed envelope including the cylindrical casing 12 and two end plates 14 and 16. Within the outer casing 12 is a concentric cylindrical cathode 18. It has an emissive surface 20 and is provided with heating wires of high-resistance material (not shown). In operation, the inner surface 20 of the cathode 18 is heated to red heat, corresponding to a temperature of approximately 850° to 900° C. Within the cathode 18 a control grid 22, which is in the form of a helical wire, may be provided. Additional supporting wires may be provided which extend in a longitudinal direction to give greater rigidity to the control grid structure.

An inner cylinder 24 of high temperature resistant glass, such as quartz or the like, is mounted concentrically with the grid and the cathode toward the center of the unit. The outer surface of the glass cylinder 24 is provided with an aluminized phosphor coating 26 having a predetermined spectral distribution of its light output as discussed below. The term aluminized phosphor coating conventionally denotes the application of a thin layer of electron-permeable and light-reflective aluminum on a phosphor layer; see Zworykin and Morten, Television, second edition, 1954. It is contemplated that electron current densities of 5, 10 or even more than 40 amperes per square centimeter may be supplied to the coating 26. The aluminized coating constitutes the anode electrode, and may be maintained at positive potentials of several thousand or more than 10,000 or 20,000 volts.

The active laser element 28 is located in the center of the vacuum tube structure. It is made up of a bundle of fiber optic rods. Suitable support rings 31 through 35 may be provided between the glass cylinder 24 and the bundle of fiber optic rods 38. In one known form the substance employed in the fiber optic rods 28 may be pink ruby material. This material, which has been employed in previous laser devices, is aluminum oxide with some of the aluminum atoms being replaced in the crystal lattice by chromium atoms. It is sometimes called "chromium-doped" aluminum oxide. Other known laser material may be employed; specifically, calcium fluoride crystals with samarium or uranium doping may be used.

It may also be noted that the outer construction as shown in the structure of FIG. 1 may be employed with a gaseous or other laser structure and is not limited in its applicability to the fiber optic arrangement.

The space between the rods 28 and the cylinder 24 may be part of the vacuum chamber. However, as discussed in detail below, it is preferable that this area by employed for coolant flow. Specifically, liquid nitrogen or other similar coolants may be transmitted through the space between the glass cylinder 24 and the fiber optic rods 28. The rings 31 through 35 may have axial openings to permit the flow of coolant. However, the presence of the rings tends to force the coolant through the interstices in the fiber optic rod structure 28 and cool it internally. In addition, the liquid nitrogen maintains the inner cylinder 24 at a sufficiently low temperature that the phosphor coating 26 is not destroyed by the intense thermal radiation from the red-hot cathode 18.

Many of the optical masers which have been proposed heretofore have employed a pair of mirrors to obtain alignment of the radiations and reinforcement of the maser action, as light buildup is produced. In the present device, the left hand end of the fiber optic bundle 28 is bonded to form an integral body 38 and the extreme end 40 of the fiber optic bundle 28 is ground, polished and silvered to provide a fully reflecting surface. The exit pupil 42 may be partially silvered in accordance with prior art proposals. However, rn j preferred embodiment of the invention, it need not be silvered as sufficient energy buildup will be obtained by one or two transits through the fiber optic rods. To obtain this action, the units may be moderately long, and units which are three or four feet long, for example, may be used.

As compared with prior art proposals in which a single crystal was employed, the fiber optic structure of FIG. 1 has a number of advantages. Thus, for example, a particular disadvantage of the large crystal device involves the imperfections which are present in the larger crystals. This prevents the desired rapid and efficient buildup of laser action.

In accordance with the present invention, however, the monocrystalline fiber optic filaments may be inspected and any defective filaments may be deleted. In addition, because the crystals which have been used heretofore have had such a large cross-sectional dimension, vibrations in many modes, a phenomenon known as multimoding, occurs. This has the undesired effect of diffusing the light output and produces a tendency toward incoherent light. The dimensions of the fibers in the active laser element 28 of FIG. 1, however, are sufficiently small that they will only sustain a relatively few wavelengths in the transverse direction; accordingly, oscillation in other than one dominant mode will be suppressed and the undesired tendency toward incoherence and light diffusion will be eliminated. It is contemplated that the fibers may be 5 microns in diameter. The fibers are of high index of refraction (about 1.70) and the surrounding medium has a relatively low index of refraction so that true fiber optic characteristics are obtained.

Figure 2:
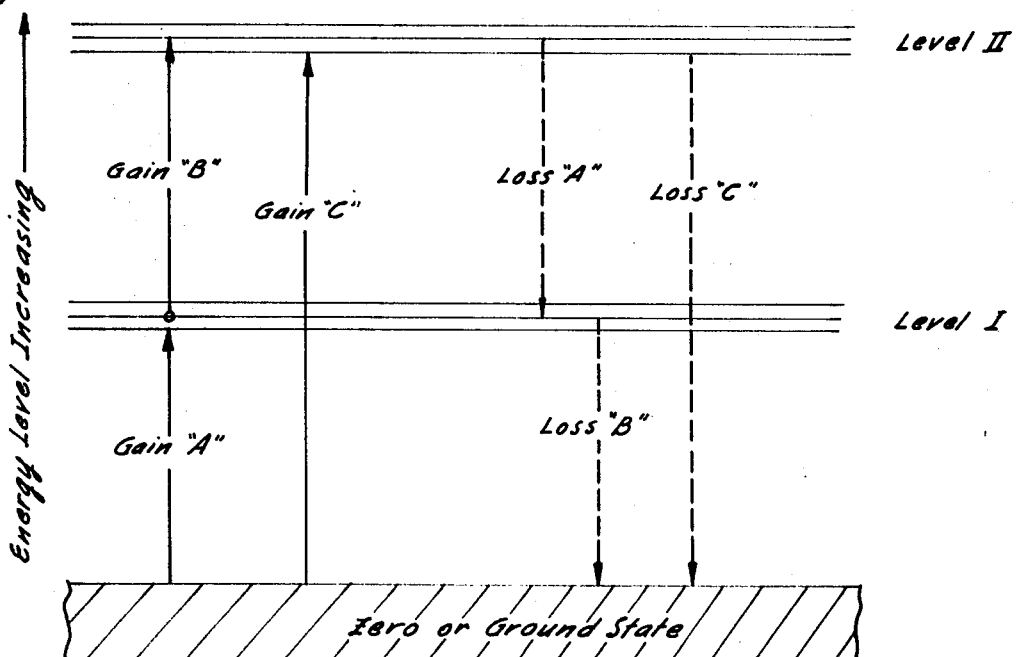
FIG. 2 is a chart indicating the energy level transitions which may occur in a typical laser.

Now that a basic device has been described, the theory of lasers will be considered to the next level of depth in connection with the chart of FIG. 2. In this figure, the vertical direction represents energy levels, with the ground state appearing at the bottom of the diagram, and level I and level II appearing at successive higher elevations. The levels I and II are sometimes referred to as "energy bands." Because of the restricted nature of the possible energy states, only a certain specific set of transitions between energy bands and between or from one energy band to the ground level are possible. These possible transitions are designated by the letters A, B and C. Atoms may be raised in energy level by applied energy, and they may then lose the energy and thus descend by steps to the so-called "zero" or ground state. The gain of energy may be accomplished in a number of ways, by heating, by collision of moving particles, or by radiation from various sources. When an atom passes from a higher to a lower energy level, an emission normally occurs at a characteristic wavelength or frequency which is determined by the difference in energy.

In the case of a solid state laser employing a chromium-doped aluminum oxide, or a pink ruby, atoms may be raised to levels I and II by radiation with green light. Following the upward transition to levels I and II, the atoms will fall back to the lower energy state. Level I, the intermediate level, is known as a metastable state. In the transition from level I to the ground state (designated loss B), red-colored light is emitted. This transition may be stimulated by the impingement of red light of the identical frequency, derived, for example, from another transition.

The stimulation action is important and a particular refinement of this phenomenon makes possible the laser or maser action. It is the remarkable property that the emission or radiation from a stimulated metastable conditioned atom reinforces the stimulus from another source in exact frequency and phase. Thus, in the body of a crystal having a relatively large number of energized atoms a cascading effect will be observed, in that a coherent signal of increasing amplitude will occur. Thus, each transition will trigger more than one additional transition and this reaction may sweep through the entire crystal until all of the energized atoms have been triggered from the metastable level to the ground state. For continuous operation in amplification applications, input "pumping" energy is continuously supplied to maintain a high concentration of atoms in the desired excited state.

Figure 3:
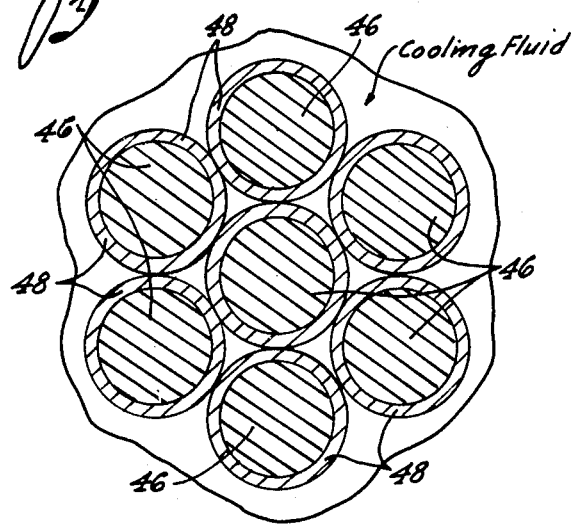
FIGS. 3 and 4 are diagrams indicating possible arrangements of the individual fibers in the laser of FIG. 1.
Figure 4:
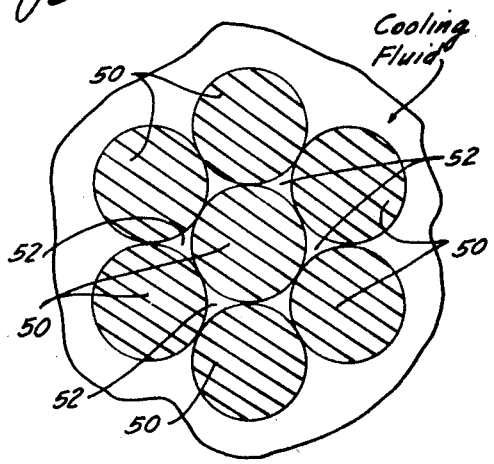

Returning to the detailed embodiments of the invention, FIGS. 3 and 4 are detailed cross-sectional views of two alternative forms of the fiber optic bundle 28 of FIG. 1. In FIG. 3 the actual fiber optic elements 46 shown with heavy cross section lines are coated with individual layers 48. The index of refraction of the pink ruby fibers 46 may be approximately 1.78 whereas that of the enclosing layer (glass or other transparent material), may be approximately 1.52. This difference of refractive index will produce total internal reflection of light travelling longitudinally through the fibers 46. However, light travelling in a direction perpendicular to the axis of fibers 46 will pass through the coatings 48 to the adjacent ruby fibers 46. This cross-coupling will provide the desired coherency in light across the entire rod 28.

A balance must be provided between intercoupling to obtain coherency and the increased spacing which will tend to produce the desired directivity. In the arrangement of FIG. 4, the fibers 50 are uncoated and therefore are more closely coupled with one another. They will, however, have space between one another and will not be in actual contact throughout their length so that coolant may flow into the interstitial spaces 52.

Figure 5:
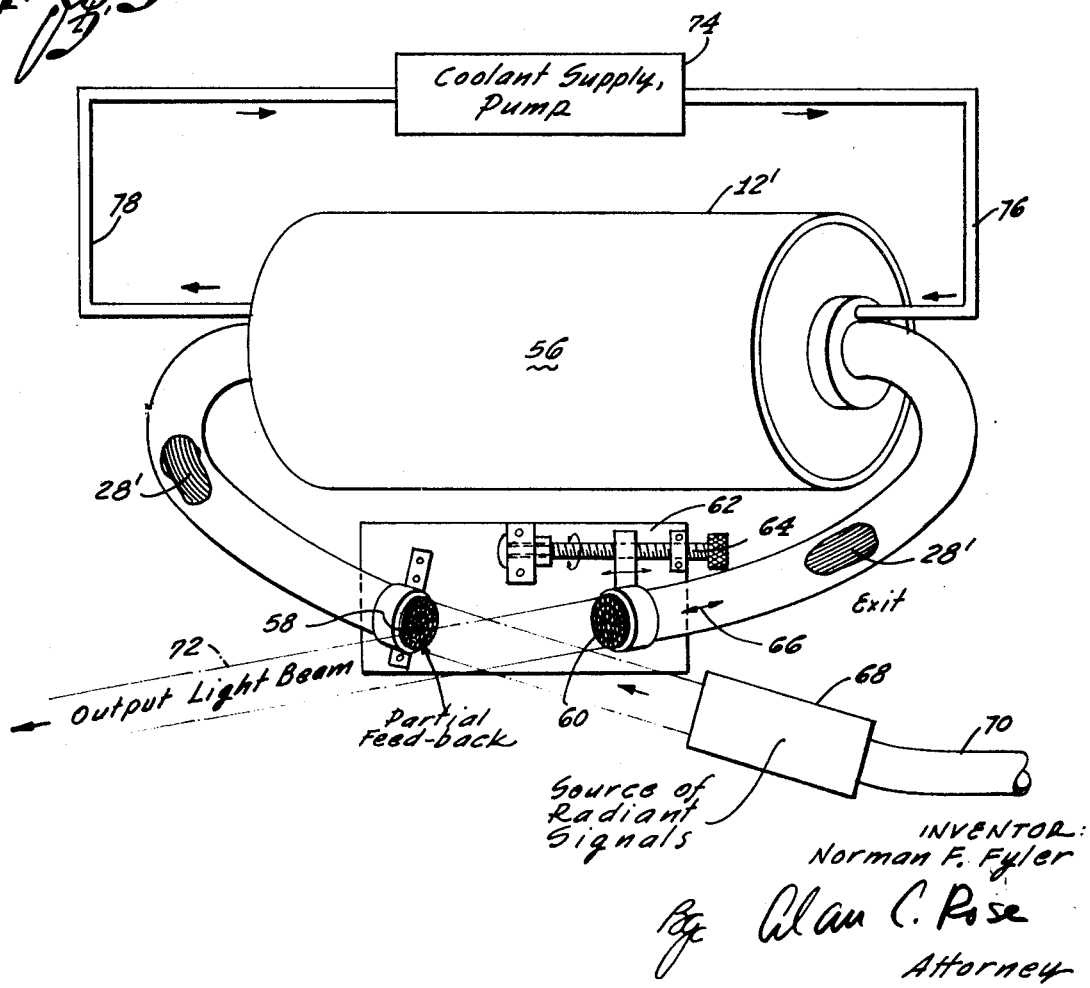
FIG. 5 is an embodiment of the invention in which a reentrant fiber optic structure is employed.

In the reentrant fiber optic system of FIG. 5, the unit 56 corresponds substantially to that of FIG. 1 and includes the outer casing 12'. The device of FIG. 5, however, includes a number of features not shown in FIG. 1. From one standpoint it may be considered to constitute a central active laser element, and two fiber optic cables. In fact, however, the ruby fiber optic cable 28' extends outwardly from both ends of the main unit 56 and terminates at ends 58 and 60. The output from the end 60 is directed to impinge partially on the end 58 of the fiber optic cable 28'. In this way, feedback may be secured and a circulating regenerative chain of transitions may be induced. In order to change the length of the complete light path circulating through the cable 28' and continuing between the ends 58 and 60, an adjusting mechanism 62 is provided. Actually, the waves initiated in the cable 28' should be precisely in phase with those recirculated through it from output end 60. A circulating cumulative breakdown should therefore sweep through the chamber 56 and the light should recirculate externally to the vacuum tube unit 56. Exact phase lock may be provided by the fine adjustment of position of the end 60 through the use of screw 64. As the screw 64 is adjusted, end 60 is moved forward or back, as indicated by the arrow 66.

External light from a source 68, for example, may be applied to the input end 58 of the fiber optic cable 28', either in addition to or separate from the feedback signals. The signal from source 68 may, for example, be derived from a communication channel indicated schematically at 70 in FIG. 5. With the input light signals triggering additional transitions in the laser unit 56, the output light beam 72 from the end 60 constitutes an amplified version of the input radiant signals from source 68.

A source of coolant 74 may be connected by suitable conduits 76 and 78 to the inner portion of the vacuum tube unit 56. With reference to FIG. 1 the coolant would flow between the cylinder 24 and the fiber optic bundle 28, and also through the interstitial spaces of the bundle 28.

In closing, it is useful to restate a number of advantages of the present laser structure. Initially, the use of very thin fibers in the fiber optic configuration avoids diffusion of light, and crystalline imperfections may be inspected and removed in the assembly process. The fiber optic configuration may also provide high optical directivity and tends to attenuate undesired extraneous light. The fiber optic structure also provides flexibility to produce a desired exit pupil optical configuration and to provide feedback through reentrant configurations. The fiber construction of the active laser element also permits ready access for coolant fluids, and thus permits high-duty factors, or continuous operation. The cathode-ray tube light source is particularly useful in a laser environment in view of the need for matching the spectral light output of the source with the required input spectral excitation of the laser element. The pulses may have extremely short rise times, because the unit is a hard or high vacuum tube. The location of the anode toward the laser structure permits conjoint cooling of the laser element and the anode by fluid flow through a single channel.

It is to be understood that the above-described arrangements are illustrative of the application of the principles of the invention. Numerous other arrangements may be derived by those skilled in the art without departing from the spirit and scope of the invention. Thus, by way of example and not of limitation, the present light source could be used for other high-intensity light requirements and could, specifically, be employed with gas maser units. Similarly, the fiber optic laser element could be excited by other light sources than that described in the present application. However, the specific light source is expressly adapted for use with the fiber optic laser unit and the combination of the particular light source and the fiber optic laser element provides a unique coaction which is an improved geometry as compared with any previous known laser apparatus. With regard to other possible variations, it is noted that any of a number of coolant liquids may be employed, and that other equivalent components may be employed in place of the particular components or apparatus shown in the present drawings. Accordingly, it is to be understood that the prevent invention is to be limited only by the spirit and scope of the appended claims.

What is claimed is:

1. A laser comprising a central fiber optic core including a plurality of individual optic fibers responsive to light of a predetermined spectral distribution for excitation into higher energy states and for the emission of coherent radiation upon discharge into lower energy states; a vacuum tube including a sleevelike elongated anode, a grid and a sleevelike elongated cathode surrounding said core and mounted concentrically and successively spaced outwardly from said core; said anode including a phosphor coating having a light output distribution of the same general range as said predetermined spectral distribution; and means for directing coolant between said core and said anode.

2. A laser comprising a central fiber optic core including a plurality of individual optic fibers of laser material responsive to light of a predetermined spectral distribution for excitation into higher energy states and for the emission of coherent radiation upon discharge to lower energy states; a vacuum tube including an anode and a cathode mounted concentrically and successively spaced outwardly from said core; said anode including a phosphor coating having a light output distribution of the same general range as said predetermined spectral distribution for supplying light to said fiber optic core, means for directing coolant between said core and said anode; and means for directing coherent radiation emitted from one end of said fiber optic core toward the other end of said fiber optic core.

3. A laser comprising; an elongated bundle of fiber optic filaments of laser material having a substantially straight portion and a first and second bent over portion containing a first and second end, respectively, of the bundle, said laser material responsive to radiation of a predetermined spectral distribution for excitation into higher energy states and for emission of coherent radiation upon discharge to lower energy states, said first end of said bundle spaced from and facing a portion of said second end of said bundle for coupling a predetermined portion of coherent radiation therebetween, and pump means for supplying radiation of said predetermined spectral distribution about the periphery of a predetermined length of said bundle.

4. The invention as defined in claim 3 further comprising means for directing external radiant energy signals toward one end of said fiber optic bundle.

5. A laser comprising a central fiber optic cable responsive to light of a predetermined spectral distribution for excitation into higher energy states, a vacuum tube including an anode and a cathode mounted concentrically and successively spaced outwardly from said cable, said anode including a phosphor coating having a light output distribution of the same general range as said predetermined spectral distribution, means for directing coolant between said cable and said anode, means for directing light from one end of said fiber optic cable toward the other end, and means for also directing modulated light signals from an external source toward said other end of said cable.

6. Apparatus for intensification of electromagnetic radiation in a first predetermined wavelength range by stimulated emission of radiation comprising a volume of negative temperature material optically pumpable by light in a second predetermined wavelength range, evacuated containing means for said material, a portion of said containing means being at least partially transparent to radiation in said first predetermined wavelength range, a unitary reflecting layer comprising a cathodo-luminescent material for emitting light in said second predetermined wavelength range adjacent a portion of said volume of negative temperature material with said cathodo-luminescent material being positioned to emit light in said second predetermined wavelength range into said volume portion of negative temperature material, said layer further forming a surface partially surrounding said volume of negative temperature material, whereby light in said second predetermined wavelength range which is not absorbed by said negative temperature medium is reflected back through said medium, there being a path between said cathodo-luminescent material and said volume portion substantially transparent to light of said second predetermined wavelength range, and means for generating a stream of high velocity electrons to impinge on said layer to cause luminescence thereof in said second wavelength range.

7. In a device for generating a coherent beam of electromagnetic energy through stimulated emission of radiation, the combination comprising:
   means including a crystalline specimen of laser material responsive to stimulation by energy at a first frequency for producing a coherent output beam of electromagnetic energy at a second frequency;
   optical pump means in an evacuated housing including a phosphor coated substantially cylindrical screen substantially surrounding and spaced from a major portion of said specimen and optically coupled therewith, and phosphor being responsive to the impingement thereupon of energy quanta for emitting electromagnetic radiation of said first frequency toward said specimen; and optical pump energization means including an electron source for directing electrons against said phosphor screen.

8. A device as set forth in claim 7, wherein said electron source means includes; a cathode for emitting electrons; and electric field means for accelerating electrons emitted by said cathode toward said phosphor screen for bombarding said phosphor screen.

9. A device as set forth in claim 8, wherein said phosphor screen forms a boundary of said evacuated chamber.

10. A device as set forth in claim 9, wherein said cathode is substantially cylindrical and surrounds said phosphor screen.